UNITED STATES PATENT OFFICE.

ANTON KARL KERPELY, OF ORAVITZA, HUNGARY, AUSTRIA, ASSIGNOR TO A. L. FLEURY, OF NEW YORK, N. Y.

IMPROVEMENT IN THE MANUFACTURE OF IRON.

Specification forming part of Letters Patent No. 52,656, dated February 13, 1866.

*To all whom it may concern:*

Be it known that I, ANTON KARL KERPELY, of Oravitza, Hungary, in the Empire of Austria, have invented a new and useful Improvement in the Manufacture of Iron; and I do hereby declare that the following is a full, clear, and exact description of the same.

This invention consists in freeing pig-iron from sulphur, phosphorus, arsenic, copper, and zinc by blowing chlorine salts with a blast of air into the melting-chambers of a blast-furnace or into a cupola-furnace or Bessemer melting-pot, whereby an instantaneous decomposition of these salts into chlorine and their bases is produced, the chlorine, on account of its strong affinity for sulphur, phosphorus, arsenic, copper, and zinc, combining with those substances very rapidly, and a quick refinement of the iron being effected by the volatilization of those substances.

The chlorine salts, which I prefer to use on account of their cheapness, are the chlorides of sodium, ammonium, potassium, calcium, and iron. The freed bases of the three first-named salts form combinations of cyanogen which accelerate the carbonization of pig-iron, and with it production of iron. The use of chloride of iron permits also the utilization of the slag, which heretofore, in the extraction of copper from pig-iron, has been thrown away, chloride of iron, with the live coal which is present and atmospheric air, always forming carbonized iron and free chlorine, or eventually, according to circumstances, another volatile chlorine combination.

The advantage of this process compared with those in which steam and water are employed is very great, not only because steam, by the burning of hydrogen taking place in the upper region of the furnace, sometimes produces obstructions, but also because steam has not the same refining quality which is the attribute of chlorine toward all impurities.

Oxide of iron, which is sometimes blown into the blast-furnace, produces a slag which is rich in iron and corrodes the basin of the furnace, augmenting at the same time the consumption of coal without having half the effect of chlorine; but chlorine salts, having a volatile base, never corrode the furnace; neither does chloride of iron, whose base transforms itself directly into carbonized iron.

In carrying out my invention I so arrange a hopper with its outlet in communication with the blast-pipe of the air-blowing apparatus in connection with the furnace that the air will carry with it into the melting-chamber of the furnace the pulverized chlorine salt with which the hopper is supplied, and I provide between the hopper and the blast-pipe a suitable valve, cock, or gate to regulate the supply of the salt as may be required.

What I claim as my invention, and desire to secure by Letters Patent, is—

Freeing pig-iron from sulphur, phosphorus, arsenic, copper, and zinc by blowing chlorine salts with a blast of air into the melting-chamber of a blast-furnace, into a cupola-furnace, or into a Bessemer smelting-pot, substantially as herein specified.

ANTON KARL KERPELY.

Witnesses:
S. HUP,
Dr. OTTO GMELIN.